(12) United States Patent
Lisart et al.

(10) Patent No.: US 10,389,521 B2
(45) Date of Patent: Aug. 20, 2019

(54) PROTECTION OF ENCRYPTED INFORMATION DURING A PROCESSING BY A PROCESSING UNIT

(71) Applicant: STMicroelectronics (Rousset) SAS, Rousset (FR)

(72) Inventors: Mathieu Lisart, Aix en Provence (FR); Benoit Durand, Rousset (FR); Massimo Cervetto, Roquebrune sur Argens (FR); Christophe Laurencin, Peypin (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 223 days.

(21) Appl. No.: 15/138,573

(22) Filed: Apr. 26, 2016

(65) Prior Publication Data

US 2017/0141913 A1 May 18, 2017

(30) Foreign Application Priority Data

Nov. 12, 2015 (FR) ..................................... 15 60821

(51) Int. Cl.
| | |
|---|---|
| *H04L 9/00* | (2006.01) |
| *G06F 21/55* | (2013.01) |
| *G06F 21/75* | (2013.01) |
| *G06F 21/74* | (2013.01) |
| *G06F 21/85* | (2013.01) |

(52) U.S. Cl.
CPC ............ *H04L 9/004* (2013.01); *G06F 21/556* (2013.01); *G06F 21/74* (2013.01); *G06F 21/75* (2013.01); *G06F 21/85* (2013.01); *G06F 2221/2123* (2013.01); *G06F 2221/2127* (2013.01)

(58) Field of Classification Search
CPC ....................................................... H04L 9/004
See application file for complete search history.

(56) References Cited

U.S. PATENT DOCUMENTS

| | | | | |
|---|---|---|---|---|
| 5,805,706 A | * | 9/1998 | Davis | ........................ H04L 9/06 713/153 |
| 7,500,112 B1 | * | 3/2009 | Wille | ...................... G06F 21/72 713/193 |
| 8,732,468 B2 | * | 5/2014 | Roy | ........................ G06F 21/85 713/171 |
| 2004/0186979 A1 | | 9/2004 | Janke et al. | |
| 2009/0316899 A1 | | 12/2009 | Kim et al. | |
| 2010/0107245 A1 | | 4/2010 | Jakubowski et al. | |

FOREIGN PATENT DOCUMENTS

| | | |
|---|---|---|
| CN | 1127900 A | 7/1996 |
| CN | 1304116 A | 7/2001 |
| CN | 203840359 U | 9/2014 |

OTHER PUBLICATIONS

French Search Report, dated Apr. 11, 2016, for corresponding FR Application No. 1560821, 2 pages.

* cited by examiner

*Primary Examiner* — Kambiz Zand
*Assistant Examiner* — Thanh H Le
(74) *Attorney, Agent, or Firm* — Seed IP Law Group LLP

(57) ABSTRACT

A circuit includes a first processing unit and a second identical processing unit. A first communication bus passes encrypted data between one of a plurality of functions and one or both of the first and second processing units. A selection circuit determines whether the encrypted bus is coupled to the first processing unit, the second processing unit, or both of the first and second processing units.

23 Claims, 1 Drawing Sheet

PROTECTION OF ENCRYPTED INFORMATION DURING A PROCESSING BY A PROCESSING UNIT

This application claims the priority benefit of French Patent application number 15/60821, filed on Nov. 12, 2015.

BACKGROUND

Technical Field

The present disclosure generally relates to electronic circuits and, more specifically, to microcontrollers or processing units manipulating encrypted information (data, instructions, addresses, etc.). The present disclosure more specifically relates to the protection of such a processing against fault-injection attacks.

Description of the Related Art

In many applications, processing units, for example, central processing units (CPU) of microcontrollers, manipulate information which are stored in encrypted fashion in volatile or non-volatile memories external to the processing unit or exchanged in encrypted fashion with other circuits or functions.

Since it is encrypted in the memories, the information is protected. However, to be processed, be it data, addresses, or instructions, the information should be decrypted by the processing unit. The processing results are, before being output by the processing unit (to be stored or communicated to another function), encrypted by the processing unit.

The fact for the information to be manipulated in non-encrypted fashion by the processing unit is a weakness in the protection.

To attempt overcoming this problem, it has already been provided to use an additional processing unit having the function of executing in parallel the same operations as the main processing unit, and of comparing certain results provided by the two processing units. In case of a divergence, this means that the main processing unit has been submitted to an attack, typically a fault injection, and the system may react, for example, by blocking the communication of the information to the outside.

However, in case of a fault injection on the verification elements or of multiple faults, these solutions appear to be insufficient.

There thus is a need to improve the protection of encrypted information during the unencrypted execution thereof by a processing unit.

The subject matter discussed in the Background section is not necessarily prior art and should not be assumed to be prior art merely as a result of its discussion in the Background section. Along these lines, the recognition of one or more problems in the prior art discussed in the Background section and the subject matter associated therewith should not be treated as prior art unless expressly stated to be prior art. Instead, the discussion in the Background section encompassing one or more recognized problems in the prior art should be treated as part of the inventor's approach to the particular problem, which in and of itself may also be inventive.

BRIEF SUMMARY

An embodiment overcomes all or part of the disadvantages of usual solutions of protection of information manipulated by processing units.

An embodiment provides a solution which is efficient against multiple fault injection attacks in a duplicated processing unit system.

An embodiment provides a solution compatible with current modes of communication of information outside of the processing unit, be it for storage or a processing by another function.

Thus, an embodiment provides a circuit comprising a first processing unit and a second identical processing unit; a first encrypted bus of communication with one of a plurality of functions; and a selector of connection of said first bus to the first and second units.

According to an embodiment, the selector selectively transmits, to the first bus, information originating from the first or from the second processing unit.

According to an embodiment, the selection is random.

According to an embodiment, the selection is under control of a user.

According to an embodiment, the selection is a function of the processing carried out by the processing units.

According to an embodiment, the selector transmits in parallel to the first and second processing units information originating from the first bus.

According to an embodiment, the circuit further comprises a module for comparing information processed by the first and second processing units.

According to an embodiment, the function(s) include volatile and/or non-volatile memories storing encrypted information.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

Figure 1:
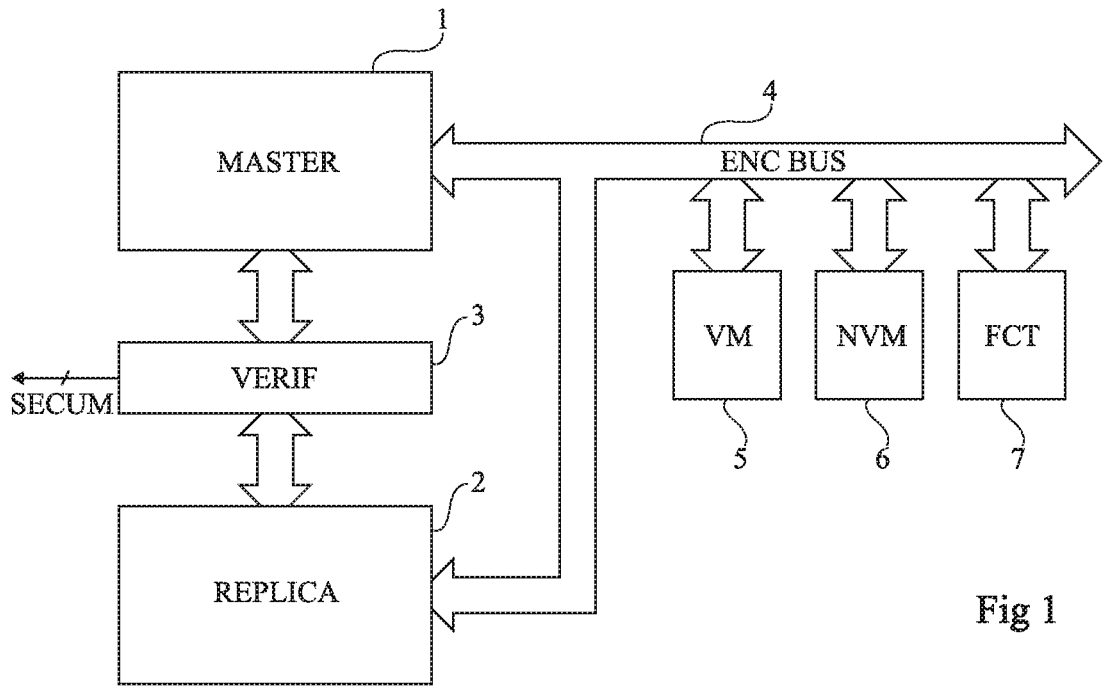
FIG. 1 schematically shows in the form of blocks a usual embodiment of a system with a duplicated processing unit.

The same elements have been designated with the same reference numerals in the different drawings. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed. In particular, the applications of the executed processings or of the circuits executing them have not been detailed, the described embodiments being compatible with usual applications. When reference is made to terms "about", "approximately", or "in the order of", this means to within 10%, preferably to within 5%.

FIG. 1 is a block diagram of an example of a microcontroller equipped with two processing units 1 and 2 executing the same operations in parallel.

One of the processing units is the useful or master unit (MASTER), that is, unit 1 carries out the processings which are taken into account. The other processing unit 2 is a replica (REPLICA) of master unit 1 and executes the same processings but only for verification purposes. Various signals originating from master and replica units 1 and 2 are processed by a verification module 3 (VERIF). The module delivers one or a plurality of signals SECUM for validating the identity of the processings carried out.

Units 1 and 2 receive in parallel the same information from a bus 4 conveying encrypted information originating from various functions, for example, from volatile storage elements 5 (VM), non-volatile storage elements 6 (NVM), or other functions 7 (FCT) internal or external to the microcontroller containing units 1 and 2. Elements 5, 6, and 7 may contain clear information (non-encrypted), but the information considered herein is the encrypted information contained or provided by these elements. For each processing of (encrypted) information by unit 1, the same information, also encrypted, is decoded and processed by unit 2. In fact, units 1 and 2 are strictly identical.

This system operates acceptably in the case of a fault injection attack on master unit 1. Indeed, the result of the comparison provided by module 3 will be, in case of an attack, erroneous, which enables to take any countermeasure adapted to the application (locking, resetting, new attempt, etc.).

However, in case of multiple attacks, for example, in case of an attack on unit 1 and on module 3, or in case of multiple time attacks, there is a high risk of not efficiently protecting the circuit.

Figure 2:
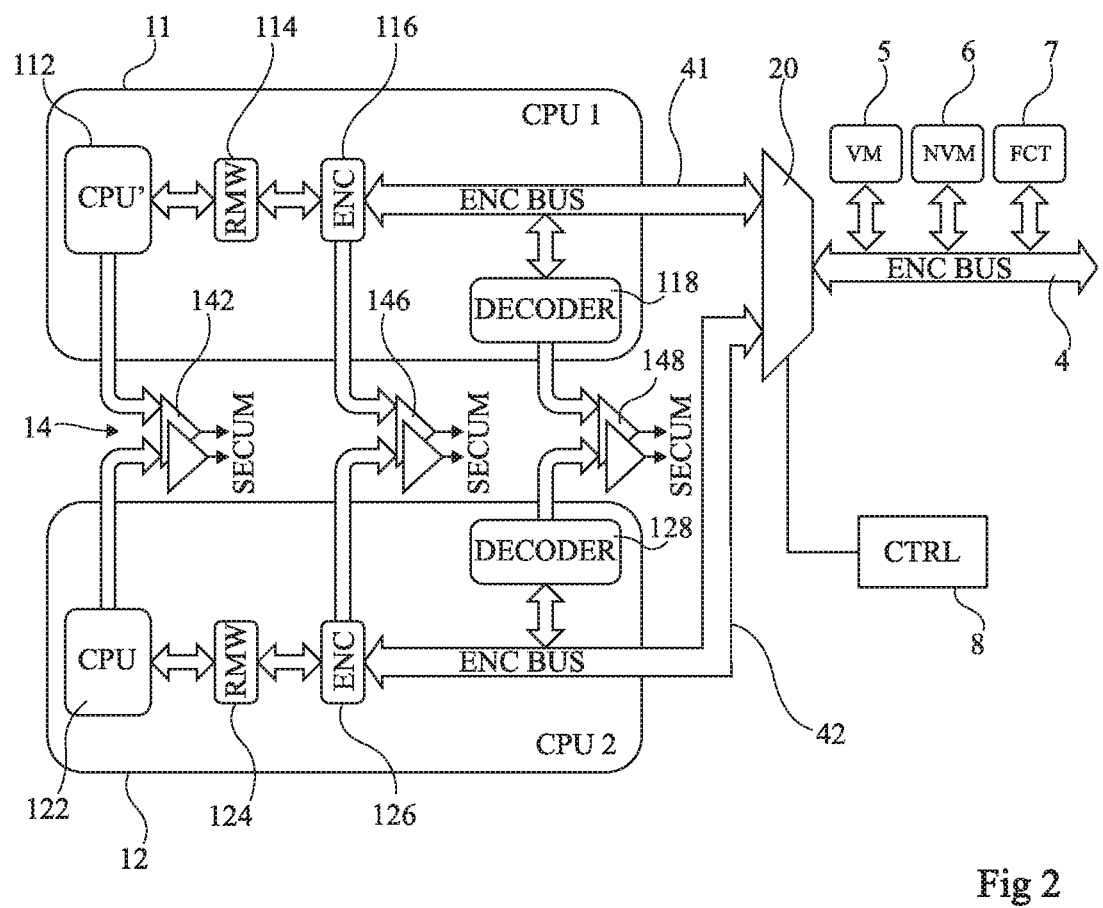
FIG. 2 schematically shows in the form of blocks an embodiment of an electronic circuit of duplicated processing unit microcontroller type.

FIG. 2 very schematically shows in the form of blocks an embodiment of a microcontroller.

According to this embodiment, the microcontroller comprises two processing units 11 and 12, for example, central processing units CPU1 and CPU2. Conversely to the example of FIG. 1, the two units 11 and 12 are used in alternation to process and/or deliver useful information.

For example, each unit 11, 12 comprises, among others, a central processing unit 112, 122 (CPU), a circuit 114, 124 (RMW) identifying the nature of the operation to be carried out between a read, modification, or write operation, and a circuit 116, 126 (ENC), for decrypting or encrypting the information exchanged with the outside of processing unit 11 or 12. Circuits 116 and 126 are connected to the bus(es) having their information desired to be monitored. This connection is performed, in the described embodiments, via multiplexer or selector 20. Thus, volatile or non-volatile memory or memories 5 (VM) or 6 (NVM) as well as the various other functions 7 (FCT) capable of exchanging encrypted information with processing units 11 and 12 are coupled to one or a plurality of encrypted data, address, or instruction buses 4 (ENC BUS), which are coupled to multiplexer or selector 20. On the side of processing units 11 and 12, the encrypted information (data, addresses, instructions) also transit over one or a plurality of data, address, or instruction buses 41 or 42 (ENC BUS) all the way to or from multiplexer 20.

In the shown example, a circuit 14 for comparing the information processed by processing units 11 and 12 is provided. This circuit may for example compare (comparator 142) the contents of data or index registers of processing units 112 and 122, compare (comparator 146) the encrypted and/or decrypted results of encryption and decryption circuits 116 and 126, compare (comparator 148) the information read from the external elements and decoded by decoders 118 and 128 dedicated to the system.

Comparators 142, 146, and 148 output one or a plurality of signals SECUM for validating the authenticity of the information, capable of being exploited to lock the system, to prevent the provision of data over the bus, to reset the system, or for any other adapted countermeasure according to the application.

Multiplexer or selector 20 is controlled by a module 8 (CTRL), preferably integrated to the microcontroller containing the two units 11 and 12, to alternately use one of the two units 11 and 12 as a useful unit and as a replica unit. The control of multiplexer 20 may be random, under control of the user, according to the application executed by the system, according to the executed operations, etc.

In the direction from the outside to the processing units, the two units receive the information in parallel to perform the same processings and allow the comparison. The multiplexer thus branches the signals of bus 4 towards the two buses 41 and 42. However, in the direction from the processing units to the outside, only bus 41 or 42 corresponding to the useful processing unit is branched, by control unit 8, towards the bus.

Thus, conversely to a usual system, the two processing units 11 and 12 output useful information. Accordingly, it becomes much more difficult for an attacker to provide multiple fault injections and to monitor the direct or indirect information (analyses of the consumption or of the radiation) to obtain information.

An advantage of the embodiments which have been described is that they require no modification of the buses or of the processings carried out. Indeed, the two processing units 11 and 12 keep on operating, blindly, as units processing all the information, the selection between the useful unit and the replica unit being performed at the level of the bus(es) of communication with the various functions capable of using the information, particularly, the memories internal and/or external to the microcontroller.

Another advantage is that the operation is transparent for the outside. Indeed, circuit 8 manages the branching of the information towards bus 4 without for the functions for which the information is intended to have to take into account the fact that the information originates from unit 11 or from unit 12.

Various embodiments have been described. Various alterations, modifications, and improvements will occur to those skilled in the art. In particular, the selection of the control of multiplexer 20 depends on the application and on the functions present in the microcontroller. Finally, the practical implementation of the embodiments which have been described is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A circuit, comprising:
   a first processing unit;
   a second processing unit, the second processing unit identical to the first processing unit;
   an encrypted communication bus arranged to pass encrypted data between at least one of the first and second processing units and at least one functional circuit; and
   a selection circuit configured to selectively transition the circuit between at least two states, including:
      a first state in which said first processing unit and said second processing unit process a same set of data and said first processing unit is selectively coupled to said encrypted communication bus, and
      a second state in which said first processing unit and said second processing unit process the same set of data and said second processing unit is selectively coupled to said encrypted communication bus.

2. The circuit of claim 1, wherein said selection circuit has a plurality of first bidirectional inputs coupled to the first processing unit, a plurality of second bidirectional inputs coupled to the second processing unit, a plurality of bidirectional outputs coupled to the encrypted communication bus, and a control input, the control input arranged to receive information representing a selected one of the at least two states.

3. The circuit of claim 2, comprising:
   a control circuit to randomly generate the information representing the selected one of the at least two states.

4. The circuit of claim 2 comprising:
   a control circuit to generate the information representing the selected one of the at least two states under control of a user.

5. The circuit of claim 2, comprising:
   a control circuit to generate the information representing the selected one of the at least two states as a function of the processing carried out by at least one of the first and second processing units.

6. The circuit of claim 1, wherein in when said selection circuit is operating in at least one of the at least two states, information passed from the encrypted communication bus is passed in parallel to the first and second processing units.

7. The circuit of claim 1, further comprising:
   a comparison circuit arranged to compare information processed by the first processing unit to information processed by the second processing unit, wherein the selection circuit selectively transitions the circuit based at least in part on a result of a comparison by the comparison circuit.

8. The circuit of claim 7, wherein said comparison circuit is arranged to output at least one security signal upon determining that there is a difference between information processed by the first processing unit and information processed by the second processing unit.

9. The circuit of claim 8, wherein said at least one security signal is arranged to provide an indication of authenticity of information processed by the first and second processing units, to lock the circuit, to prevent provision of data over the encrypted communication bus, or to reset the circuit.

10. The circuit of claim 1, wherein the at least one functional circuit includes at least one of a volatile memory storing encrypted information and a non-volatile memory storing encrypted information.

11. The circuit of claim 1, wherein the selection circuit is configured to selectively transition the circuit between three states, the three states including a third state in which both of said first and second processing units are selectively coupled to said encrypted communication bus.

12. A security method, comprising:
   passing encrypted data on an encrypted communication bus between at least one functional circuit and at least one of a first processing unit and a second processing unit, wherein the second processing unit is identical to the first processing unit; and
   operating a selection circuit to transition between one of at least two states, including:
      a first state in which said first processing unit and said second processing unit process a same set of data and said first processing unit is selectively coupled to said encrypted communication bus, and
      a second state in which said first processing unit and said second processing unit process the same set of data and said second processing unit is selectively coupled to said encrypted communication bus.

13. The security method of claim 12, comprising:
   randomly selecting one of the at least two states in which to operate the selection circuit.

14. The security method of claim 12, comprising:
   accepting user input representing a selection of one of the at least two states in which to operate the selection circuit.

15. The security method of claim 12, comprising:
   selecting one of the at least two states in which to operate the selection circuit as a function of the processing carried out by at least one of the first and second processing units.

16. The security method of claim 12, comprising:
   comparing information processed by the first processing unit to information processed by the second processing unit;
   determining that there is a difference between information processed by the first processing unit and information processed by the second processing unit; and
   generating at least one security signal based on the determined difference.

17. A secure system, comprising:
   a first processing means;
   a second processing means identical to the first processing means;
   an encrypted communication means to pass encrypted data between one or both of the first and second processing means and a functional circuit; and
   a selection means for selectively transitioning the secure system between at least two states, including:
      a first state in which said first processing unit and said second processing unit process a same set of data and said first processing means is selectively coupled to said encrypted communication means, and
      a second state in which said first processing unit and said second processing unit process the same set of data and said second processing means is selectively coupled to said encrypted communication means.

18. The secure system of claim 17, comprising:
   control means to randomly direct operation of the selection means into one of the at least two states;
   control means to direct operation of the selection means into one of the at least two states based on user input; or control means to direct operation of the selection means into one of the at least two states as a function of processing carried out by at least one of the first and second processing means.

19. The security method of claim 12, wherein operating the selection circuit to transition between one of at least two states includes operating the selection circuit to transition between one of three states, the three states including a third state in which both of said first and second processing units are selectively coupled to said encrypted communication bus.

20. The secure system of claim 17, further comprising:
comparison means to compare information processed by the first processing means to information processed by the second processing means, wherein said comparison means outputs at least one security signal upon determining that there is a difference between information processed by the first processing means and information processed by the second processing means.

21. The secure system of claim 20, wherein said at least one security signal is arranged to provide an indication of authenticity of information processed by the first and second processing units, to lock the secure system, to prevent provision of data over the encrypted communication bus, or to reset the secure system.

22. The secure system of claim 17, comprising:
a read, modification, or write determination means to determine a type of action to be performed on the encrypted data.

23. The secure system of claim 17, wherein the selection means is for selectively transitioning the secure system between three states, the three states including:
a third state in which both of said first and second processing units are selectively coupled to said encrypted communication bus.

* * * * *

UNITED STATES PATENT AND TRADEMARK OFFICE
CERTIFICATE OF CORRECTION

| | | |
|---|---|---|
| PATENT NO. | : 10,389,521 B2 | Page 1 of 1 |
| APPLICATION NO. | : 15/138573 | |
| DATED | : August 20, 2019 | |
| INVENTOR(S) | : Mathieu Lisart et al. | |

It is certified that error appears in the above-identified patent and that said Letters Patent is hereby corrected as shown below:

In the Claims

Column 5, Line 43:
"6. The circuit of claim 1, wherein in when said selection" should read, --6. The circuit of claim 1, wherein when said selection--.

Signed and Sealed this
Twenty-second Day of October, 2019

Andrei Iancu
*Director of the United States Patent and Trademark Office*